United States Patent
Anderson et al.

(10) Patent No.: US 7,466,670 B2
(45) Date of Patent: Dec. 16, 2008

(54) TRANSMIT SYSTEM EMPLOYING AN ANTENNA AND BALANCED AMPLIFIER ARCHITECTURE WHICH PROVIDES POWER AMPLIFIER LOAD BALANCING INDEPENDENT OF SINGLE OR DUAL SIGNAL OPERATION OF THE TRANSMITTER

(75) Inventors: Fred Anderson, Lakeville, OH (US);
Paul Stager, Cuyahoga Falls, OH (US);
Daniel Lyons, Chippewa, OH (US)

(73) Assignee: Cisco Technology, Inc.

( * ) Notice: Subject to any disclaimer, the term of this patent is extended or adjusted under 35 U.S.C. 154(b) by 612 days.

(21) Appl. No.: 10/914,370

(22) Filed: Aug. 9, 2004

(65) Prior Publication Data
US 2006/0030280 A1 Feb. 9, 2006

(51) Int. Cl.
*H04H 20/71* (2008.01)
(52) U.S. Cl. .................... 370/312; 370/395.2; 370/412; 370/229; 343/853; 343/810

(58) Field of Classification Search ................. 370/395, 370/412, 229; 343/853, 810
See application file for complete search history.

(56) References Cited

U.S. PATENT DOCUMENTS

| | | | | |
|---|---|---|---|---|
| 4,566,013 A | * | 1/1986 | Steinberg et al. | 342/372 |
| 5,596,329 A | * | 1/1997 | Searle et al. | 342/374 |
| 6,320,861 B1 | * | 11/2001 | Adam et al. | 370/395.7 |
| 6,529,715 B1 | * | 3/2003 | Kitko et al. | 455/103 |
| 6,906,681 B2 | * | 6/2005 | Hoppenstein | 343/853 |

FOREIGN PATENT DOCUMENTS

WO WO 98/11626 3/1998

* cited by examiner

*Primary Examiner*—Nay A Maung
*Assistant Examiner*—Richard Chan
(74) *Attorney, Agent, or Firm*—Tucker Ellis & West, LLP

(57) ABSTRACT

A transmit system is disclosed herein that includes two receive inputs for receiving input power distributed between two weakly correlated signals. The transmit system further includes a balanced amplifier system for dividing, amplifying, and recombining the two weakly correlated signals and a two antenna array having a first antenna element and a second antenna element for radiating the amplified signals. The transmit system is capable of unicast and multicast transmissions.

21 Claims, 4 Drawing Sheets

TRANSMIT SYSTEM EMPLOYING AN ANTENNA AND BALANCED AMPLIFIER ARCHITECTURE WHICH PROVIDES POWER AMPLIFIER LOAD BALANCING INDEPENDENT OF SINGLE OR DUAL SIGNAL OPERATION OF THE TRANSMITTER

BACKGROUND OF THE INVENTION

The present invention is generally directed to transmitter systems capable of switched operation between a single transmit path and two transmit paths with weakly correlated signals in each path. More specifically, the present invention is directed to the field of wireless local area network transmitter systems. In particular, the present invention applies to wireless local area network access points using orthogonal frequency division multiplexing with two antenna transmit maximum ratio combining.

Wireless local area networks typically include an access point that wirelessly communicates with one or more clients. The access point also generally provides a wired connection for communicating with the network. Thus, the access point provides an interface between the wired network and the remote or wireless clients.

Wireless local area network access point operation is often defined by the Institute of Electrical and Electronics Engineers (IEEE) 802.11a, 802.11b and/or 802.11g standards. A number of proprietary systems are also known to exist. In the standards based systems, data is transferred between the access point and the clients using radio frequency (RF) channels or carriers in the 2.4 Gigahertz Industry Scientific and Medical and the Universal Networking Information Infrastructure 5 Gigahertz bands. The radio frequency carriers are modulated using various digital modulation techniques that include; for example, direct sequence spread spectrum and orthogonal frequency division multiplexing modulation techniques.

Although an access point can support a radio link with many clients, an access points must also be capable of a "unicast" transmission intended for a single client. Moreover, it is desirable to optimize the unicast transmission for the intended client to improve the robustness of the data transfer between the access point and the intended client. A unicast transmission can be optimized in a wireless local area network using two antenna transmit maximum ratio combining. Two antenna transmit maximum ratio combining seeks to overcome the signal to noise degradation at the intended client caused by multiple reflections of the signal arriving at the client which combine or add in a destructive manner. Two antenna transmit maximum ratio combining is accomplished in the access point by splitting a transmitter signal into two separate transmission paths. The signals in each transmit path are then weighted in amplitude and/or phase such that the signals recombine constructively at the intended client. Weighting can be frequency or channel specific, meaning that different weights are used for different channels within a frequency band.

As mentioned, wireless local area network operation also requires the access point to make "multicast" transmissions that are intended for multiple clients. Thus, an access point transmitter must be capable of switching between unicast and multicast transmission types. Generally, multicast transmissions use a single transmit path and a single antenna element, while unicast transmissions employing two antenna transmit maximum ratio combining require multiple transmit paths, each path having a separate respective power amplifier and antenna element.

FIGS. 1A and 1B show a transmitter system 10 that is capable of switched operation between unicast and multicast transmissions. Transmitter system 10 generally comprises a two antenna array 11 having a first antenna element 12 and a second antenna element 14. Transmitter system 10 further comprises first and second power amplifiers 16, 18, both of which have a gain G. More specifically, transmitter system 10 has a first transmit path defined by power amplifier 16 and antenna element 12 and a second transmit path defined by power amplifier 18 and antenna element 14.

As shown in FIG. 1A, and in the unicast operating mode, the input power $P_{in}$ is distributed between two signals $S_1$ and $S_2$. The power associated with $S_1$ and $S_2$ are given by the expressions $a \cdot P_{in}$ and $(1-a) \cdot P_{in}$, respectively. The distribution of the input power $P_{in}$ between signals $S_1$ and $S_2$ is not necessarily even, and the exact power distribution is accounted for in the value of a, where $0 < a \leq 1$. For example, if the value of a is allowed to equal 1, then all of the input power is distributed to signal $S_1$ and no power is distributed to signal $S_2$. This is the condition for multicast operation, shown in FIG. 1B. Thus, multicast operation for transmitter system 10 is the condition where $a=1$, and all of the input power $P_{in}$ is concentrated in signal $S_1$.

Viewed in this manner, four distinct operating conditions exist which are relevant to the design and/or selection of power amplifiers 16 and 18. These four operating conditions are as follows: (1) unicast mode where $0<a<0.5$, (2) unicast mode where $a=0.5$, (3) unicast mode where $0.5<a<1$, and, as previously described, (4) multicast mode, where $a=1$.

In the first operating condition, the input power $P_{in}$ is split unevenly between signals $S_1$ and $S_2$, and the majority of the power is delivered to power amplifier 18. If a approaches zero, nearly all of the input power $P_{in}$ will be distributed to power amplifier 18 and only a small fraction of the input power $P_{in}$ will be distributed to power amplifier 16. In the third and fourth operating conditions, when a either approaches or is equal to unity, nearly all or all of the input power $P_{in}$ will be distributed to power amplifier 16 and only a small fraction or none of the input power $P_{in}$ will be distributed to power amplifier 18. Under these operation conditions, it is possible for the entire radiated power to be delivered by a single amplifier, e.g., either power amplifier 16 or 18; and thus, to allow for all operating conditions, both power amplifiers 16, 18 must be designed and/or selected such that they are capable of delivering the entire radiated power $P_{radiated} = G \cdot P_{in}$.

Although each power amplifier 16, 18 must be designed and/or selected to deliver a maximum power level equal to $P_{radiated} = G \cdot P_{in}$, it is clear that under most conditions one or both power amplifiers 16, 18 will be operating significantly below that level. This leads to inherently inefficient operation of the power amplifiers 16, 18.

Thus, there exists a need for a transmit system that provides constant power amplifier loading between single and dual signal operation. Moreover, there is a need for a transmit system that evenly distributes single or dual signals between power amplifier components independent of operating conditions. Further, there is a need for a transmit system that provides power amplifier load balancing independent of single or dual signal operation.

SUMMARY OF THE INVENTION

In accordance with the present invention there is disclosed herein a transmit system including two receive inputs for receiving input power distributed between two weakly correlated signals. The transmit system further includes a balanced amplifier system for dividing, amplifying, and recombining the two weakly correlated signals and a two antenna array having a first antenna element and a second antenna element for radiating the amplified signals. The transmit system capable of unicast and multicast transmissions.

Further, in accordance with the present invention, there is disclosed herein a method of transmitting at least one of a unicast and multicast signal. The method includes receiving input power distributed between two weakly correlated signals, dividing the two weakly correlated signals, amplifying the divided signals, recombining the amplified signals, and radiating the recombined signals.

In one aspect of the present invention, a transmitter includes means for receiving input power distributed between two weakly correlated signals, means for dividing the two weakly correlated signals, means for amplifying the divided signals, means for recombining the amplified signals, and means for radiating the recombined signals.

These and other objects and advantages of the present invention will become readily apparent to those skilled in this art from the following description wherein there is shown and described a preferred embodiment of this invention, simply by way of illustration of one of the best modes suited to carry out the invention. As it will be realized, the invention is capable of other different embodiments and its several details are capable of modifications in various obvious aspects all without departing from the spirit of the present invention. Accordingly, the drawings and descriptions will be regarded as illustrative in nature and not as restrictive.

DETAILED DESCRIPTION OF THE DRAWINGS

Figure 2A:
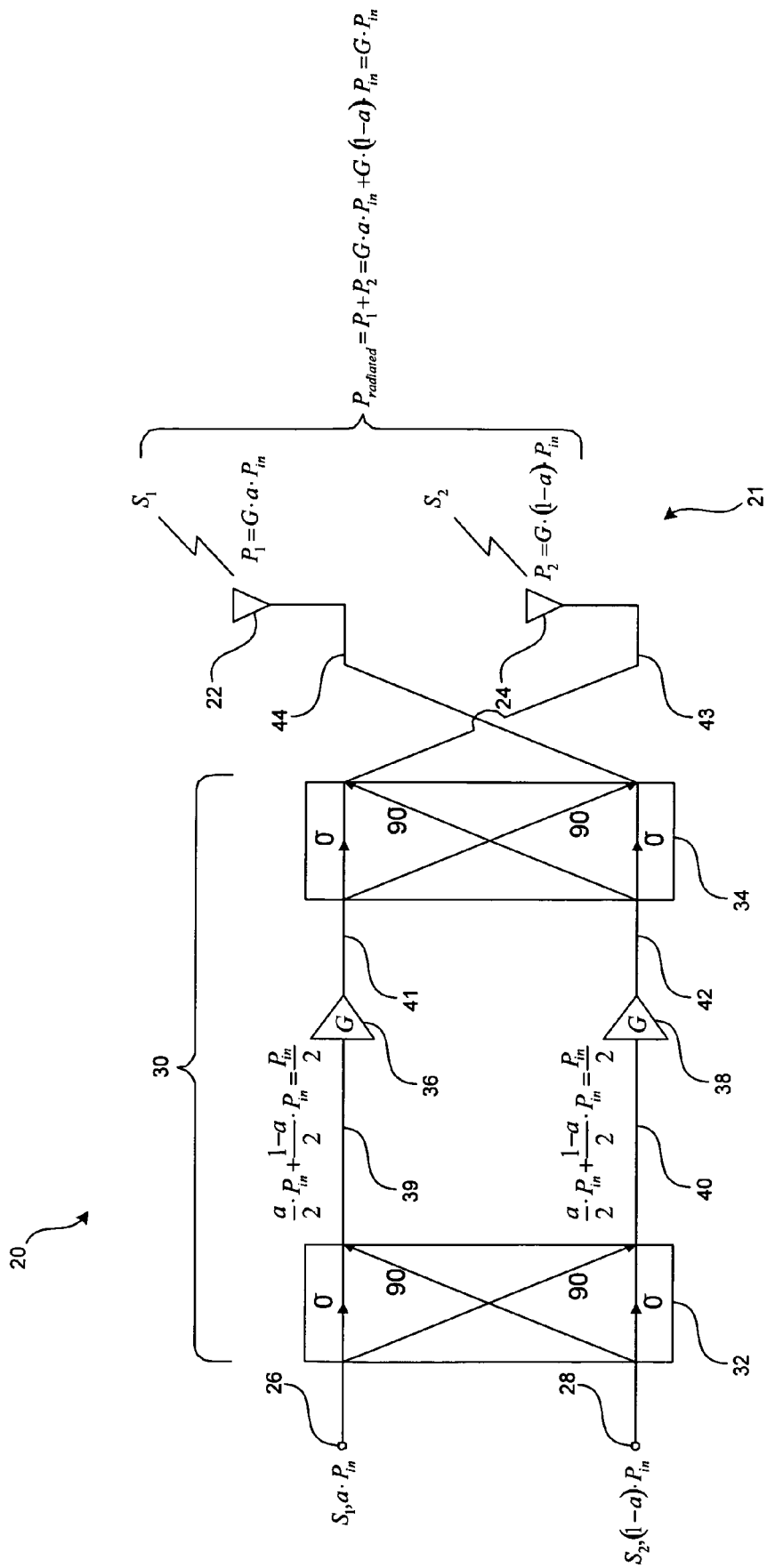
Figure 2B:
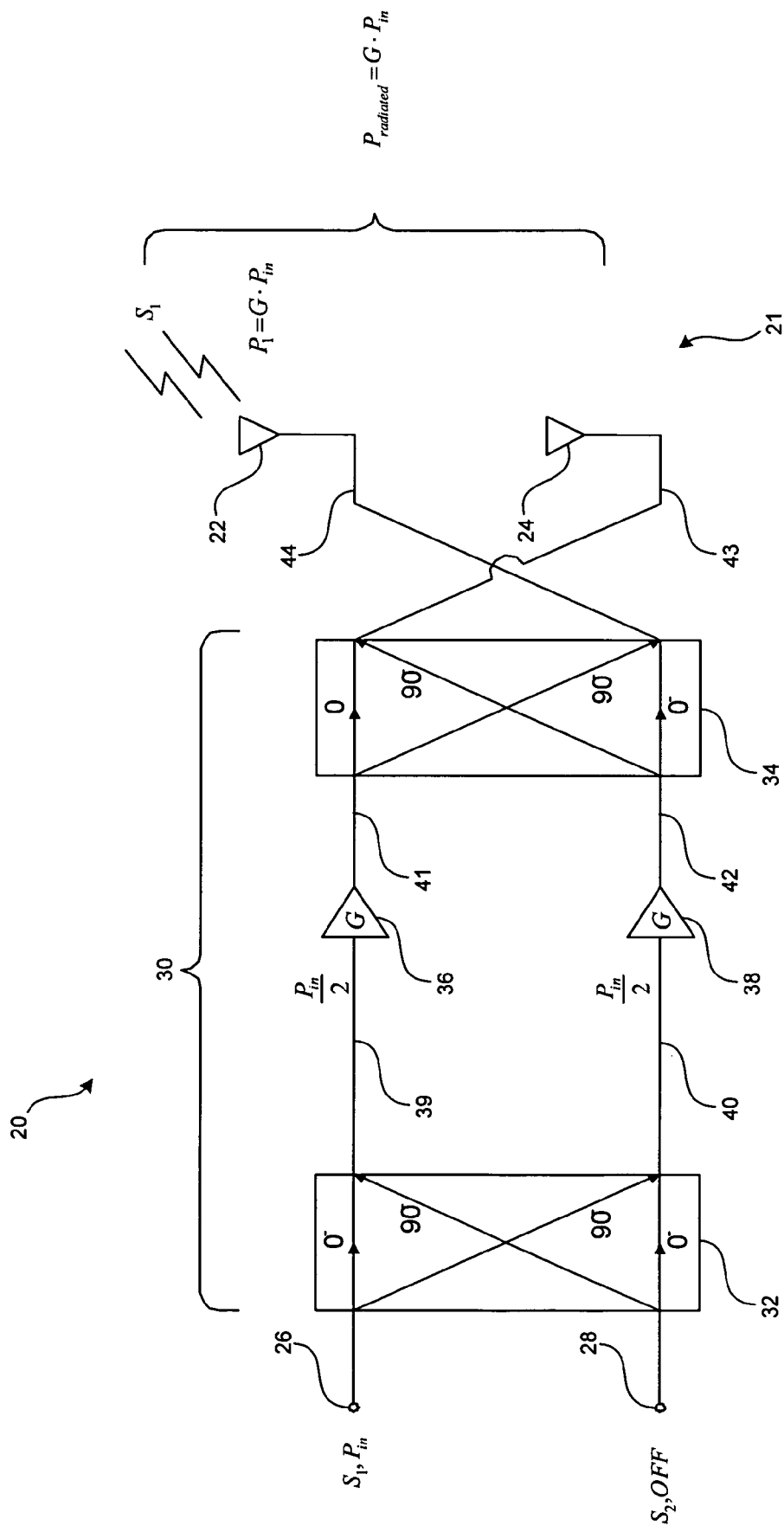

With reference to FIGS. 2A and 2B, wherein like reference numerals refer to like elements, there is shown one embodiment 20 of a transmit system capable of switched operation between unicast and multicast transmissions in accordance with principles of the present invention. More specifically, transmit system 20 comprises a two antenna array 21 having a first antenna element 22 and a second antenna element 24. Transmit system 20 further comprises a balanced amplifier system 30. Balanced amplifier system 30 comprises two quadrature 3-dB splitter/combiner networks 32, 34 and two power amplifier components 36, 38, each having a gain G.

In some embodiments, balanced amplifier system 30 can be contained within or sold as a module. In other embodiments, quadrature 3-dB splitter/combiner networks 32, 34 and power amplifier components 36, 38 can be discrete components. In still other embodiments, power amplifier components 36, 38 can be modules, commonly referred to as power amplifiers.

Figure 1A:
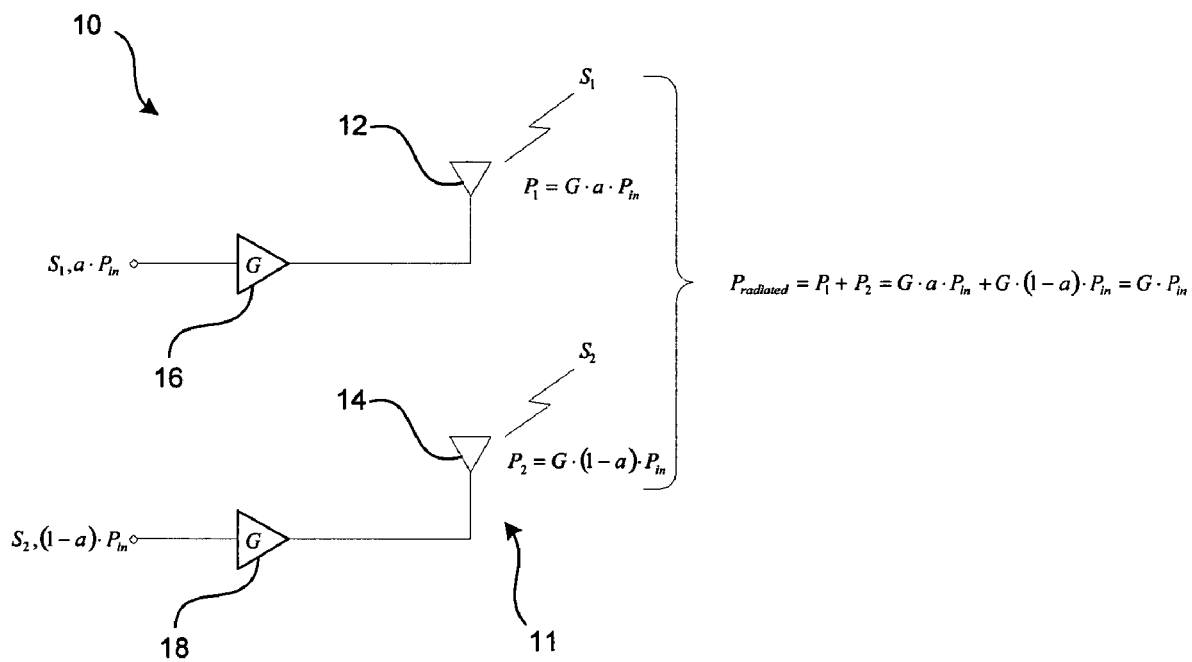
FIGS. 1A and 1B depict a previous-type transmitter system capable of switched operation between unicast and multicast transmissions; and, FIGS. 2A and 2B depict a transmit system capable of switched operation between unicast and multicast transmissions in accordance with the principles of the present invention.
Figure 1B:
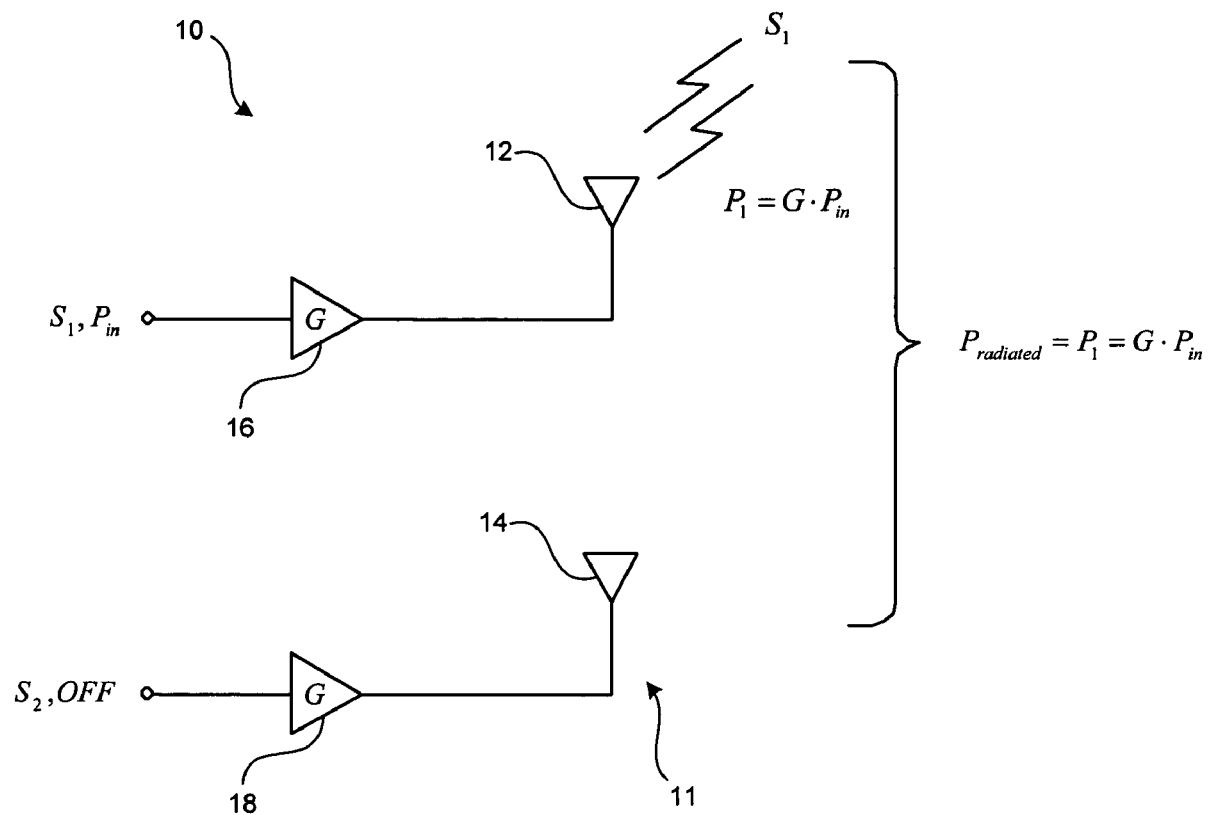

Furthermore, for purposes of the description contained herein, it will be assumed that quadrature 3-dB splitter/combiner networks 32, 34 are ideal, having no insertion or throughput power loss. However, in practice, quadrature 3-dB splitter/combiner networks 32, 34 will have some associated power loss. These associated power losses can impact the design and/or selection of power amplifier components 36, 38. However, the skilled artisan will appreciated that although these power losses exist and that these power losses can impact the design and/or selection of power amplifier components 36, 38, these losses are usually insignificant or negligible when comparing the maximum power level of amplifier components 36, 38 with power amplifiers 16, 18, shown in FIGS. 1A and 1B.

Transmit system 20 further includes two receive inputs 26, 28 for receiving input power $P_{in}$ distributed between two signals $S_1$ and $S_2$. The power associated with $S_1$ and $S_2$ are given by the expressions $a \cdot P_{in}$ and $(1-a) \cdot P_{in}$, respectively. The distribution of the input power $P_{in}$ between signals $S_1$ and $S_2$ is accounted for in the value of a, where $0 < a \leq 1$.

Signals $S_1$ and $S_2$ can be orthogonal frequency division multiplexed signals suitable for transmission on carrier frequencies in the 2.4 Gigahertz Industry Scientific and Medical and the Universal Networking Information Infrastructure 5 Gigahertz bands. Further, signals $S_1$ and $S_2$ can accord with the Institute of Electrical and Electronics Engineers (IEEE) 802.11a, 802.11b and/or 802.11g standards.

As will be described in more detail hereinafter, the combination two antenna array 21 and balanced amplifier system 30 provides a more cost effective and efficient system 20 for providing switched operation between unicast transmissions providing two antenna transmit maximum ratio combining and multicast transmissions. Given, signals $S_1$ and $S_2$ described by the expressions $a \cdot P_{in}$ and $(1-a) \cdot P_{in}$, respectively, and similar to transmitter system 10 shown in FIGS. 1A and 1B, each of the signals $S_1$ and $S_2$ are delivered to only a single antenna element 22, 24. However, in contrast to transmitter system 10, transmit system 20 ensures that the input power $P_{in}$ is evenly distributed between amplifier components 36 and 38, regardless of how the input power $P_{in}$ is divided between signals $S_1$ and $S_2$. Moreover, the conditions described for transmitter system 10 where nearly all or all of the input power $P_{in}$ is directed to a single amplifier 16, 18 is avoided. Further, amplifier components 36, 38 in transmit system 20 can be designed and/or selected for a maximum power level of $$G \cdot \frac{P_{in}}{2};$$

which is half the maximum power level of amplifiers 16, 18 in transmitter system 10.

Referring more specifically to FIG. 2A, and considering the operating conditions where $0 < a < 0.5$, $a = 0.5$, and $0.5 < a < 1$, or unicast mode, two weakly correlated signals $S_1$ and $S_2$ are input to receive inputs 26 and 28, respectively. The signal $S_1$ at receive input 26 is split equally or evenly in power by quadrature 3-dB splitter/combiner network 32 and is described by the expression $$a \cdot \frac{P_{in}}{2}$$

at nodes 39 and 40. Likewise, the signal $S_2$ at receive input 28 is split equally or evenly in power by quadrature 3-dB splitter/combiner network 32 and is described by the expression $$\frac{(1-a)}{2} \cdot P_{in}$$

at nodes 39 and 40. Since signals $S_1$ and $S_2$ are weakly correlated, the power input to each amplifier component 36, 38 at nodes 39 and 40, respectively, is the direct sum $$a \cdot \frac{P_{in}}{2} + (1-a) \cdot \frac{P_{in}}{2} = \frac{P_{in}}{2}.$$

Thus, the power input to each of the amplifier components 36, 38 is independent of how the input power $P_{in}$ is distributed; that is, independent of the value of a. Therefore, the output power of each amplifier component 36, 38 at nodes 41 and 42 is $$G \cdot \left[ a \cdot \frac{P_{in}}{2} + (1-a) \cdot \frac{P_{in}}{2} \right]$$

or, simply, $$G \cdot \frac{P_{in}}{2}$$

in unicast mode or for operating conditions where 0<a<0.5, a=0.5, and 0.5<a<1.

The amplified signals at nodes 41 and 42 are recombined by quadrature 3-dB splitter/combiner network 34 and present at nodes 44 and 43 for radiation by antenna elements 22, 24, respectively. The power $P_1$, $P_2$ from each antenna element 22, 24 is described by the expressions $P_1=G\cdot a\cdot P_{in}$ and $P_2=G\cdot(1-a)\cdot P_{in}$, respectively. Thus, the total radiated power is described by the expression $P_{radiated}=P_1+P_2=G\cdot a\cdot P_{in}+G\cdot(1-a)\cdot P_{in}=G\cdot P_{in}$. It will be appreciated that the total power radiated $P_{radiated}$, as well as the power $P_1$, $P_2$ from each antenna element 22, 24 in transmit system 20 is the same as that for transmitter system 10 and antenna elements 12 and 14 shown in FIG. 1A.

Referring more specifically to FIG. 2B, and considering the operating condition where a=1, or multicast mode, a signal $S_1$ is input into receive input 26. As annotated, signal $S_2$ is effectively off, or OFF. The signal $S_1$ at receive input 26 is split evenly in power by quadrature 3-dB splitter/combiner network 32 and is described by the expression $$\frac{P_{in}}{2}$$

at nodes 39 and 40. Thus, the power input to each of the amplifier components 36, 38 is equal and independent of the value of a. Therefore, the output power of each amplifier component 36, 38 at nodes 41 and 42 is $$G \cdot \frac{P_{in}}{2}$$

in multicast mode or for the operating condition where a=1.

The amplified signals at nodes 41 and 42 are recombined by quadrature 3-dB splitter/combiner network 34 and present at node 44 for radiation by antenna element 22. The power $P_1$ from antenna element 22 is described by the expression $P_1=G\cdot P_{in}$. Thus, the total radiated power is described by the expression $P_{radiated}=G\cdot P_{in}$. It will be appreciated that the total power radiated $P_{radiated}$, as well as the power $P_1$ from antenna element 22 in transmit system 20 is the same as that for transmitter system 10 and antenna element 12 shown in FIG. 1B.

Thus, in light of the forgoing, transmit system 20 provides constant power amplifier loading, e.g., whereby a signal described by $$\frac{P_{in}}{2}$$

is applied to both amplifier components 36, 38, between single and dual signal $S_1$, $S_1$ and $S_2$ operation, as was described in detail with FIGS. 2B and 2A, respectively. Moreover, transmit system 20 evenly distributes single or dual signals $S_1$, $S_1$ and $S_2$ between power amplifier components 36, 38 independent of operating conditions, or for all values of a. Further, transmit system 20 provides power amplifier load balancing for amplifier components 36, 38 independent of single or dual signal $S_1$, $S_1$ and $S_2$ operation.

Using the present invention, a desired radiated output power is obtained using substantially smaller power amplifiers, while delivering optimal performance in both unicast and multicast modes. Therefore, the expense associated with the power amplifiers is reduced, representing a savings of "dollars on the board" compared with previous systems. In both unicast and multicast modes, efficiency is improved, since the respective amplifiers components 36, 38 are operating at an optimum power level rather than a reduced level as with previous-type systems.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept.

We claim:

1. A transmit system comprising:
   two receive inputs for receiving input power distributed between two weakly correlated signals, wherein a first signal of the weakly correlated signals is received on a first input of the two receive inputs and a second signal of the weakly correlated signals is received on a second input of the two receive inputs;

a balanced amplifier system for dividing, amplifying, and recombining the two weakly correlated signals, the balanced amplifier comprises:
  a splitter having a first input for receiving the first signal and a second input for receiving the second signal, and first and second outputs, wherein the splitter is configured to provide one half the power of the first signal to the first output and one half the power of the first signal to the second output, wherein the splitter is further configured to provide one half the power of the second signal to the first output and one half the power of the second signal to the second output;
  a first amplifier having an input and an output, wherein the input is coupled to the first output of the splitter a second amplifier having an input and an output, wherein the input of the second amplifier is coupled to the second output of the splitter
  a combining circuit having first and second inputs coupled to the outputs of the first and second amplifiers respectively, and first and second outputs, wherein the combining circuit is configured to recombine the first signal from the outputs of the first and second amplifiers and to recombine the second signal from the outputs of the first and second amplifiers, wherein a recombined, amplified, first signal is provided at the first output of recombining circuit and a recombined, amplified second signal is provided at the second output of the recombining circuit; and
  a two antenna array having a first antenna element coupled to the first output of the combining circuit and a second antenna element coupled to the second output of the combining circuit for radiating the amplified signals;
wherein the transmit system capable of switched operation between unicast and multicast transmissions;
wherein the input power is distributed to the first signal is a·Pin and the input power distributed to the second signal is (1−a)·Pin;
wherein in unicast mode a is greater than 0 and less than 1;
wherein in multicast mode a is equal to 1; and
wherein Pin is the total input power.

2. The transmit system of claim 1, wherein the splitter comprises:
  a quadrature 3-dB splitter/combiner network; and
  the combining circuit comprises a quadrature 3-dB splitter/combiner network.

3. The transmit system of claim 2, wherein the first and second amplifiers are half power amplifiers that produce a full power amplified signal upon recombination of the amplified split weakly correlated signals.

4. The transmit system of claim 2, wherein the two power amplifier components are constantly loaded in unicast and multicast operation.

5. The transmit system of claim 2, wherein the two weakly correlated signals are evenly distributed between the two power amplifier components in unicast and multicast operation.

6. A method of transmitting at least one of a uinicast and multicast signal, comprising:
  receiving input power distributed between two weakly correlated signals, a first of the two weakly correlated signals received on a first input and a second of the two weakly correlated signals received on a second input;
  dividing the two weakly correlated signals, wherein a first divided signal comprises one-half the first signal and one-half the second signal and a second divided signal comprises one-half the first signal and one-half the second signal;
  amplifying the first divided signal by a first amplifier;
  amplifying the second divided signal by a second amplifier;
  recombining the amplified, divided signals, wherein a recombined, amplified first signal is provided at a first output and a recombined, amplified second signal is provided to a second output; and
  radiating the recombined signals by first and second antennas coupled to the first and second outputs respectively;
wherein the input power is distributed to the first weakly correlated signal is a·Pin and the input power distributed to the second weakly correlated signal is (1−a)·Pin;
wherein in unicast mode a is greater than 0 and less than 1;
wherein in multicast mode a is equal to 1; and
wherein Pin is the total input power.

7. The method of claim 6, wherein the two weakly correlated signals are divided, amplified, and recombined using a balanced amplifier system.

8. The method of claim 6, wherein the two weakly correlated signals are divided using a quadrature 3-dB splitter/combiner network.

9. The method of claim 6, wherein the amplified signals are recombined using a quadrature 3-dB splitter/combiner network.

10. The method of claim 6, wherein the divided signals are amplified using two power amplifiers components.

11. The method of claim 10, wherein the two power amplifiers components are respective half power amplifiers so as to produce a full power amplified signal upon recombination of the amplified split weakly correlated signals.

12. The method of claim 6, further comprising constantly loading power amplifier components in unicast and multicast operation.

13. The method of claim 6, further comprising evenly distributing the two weakly correlated signals between two power amplifier components.

14. A transmitter comprising:
  means for receiving input power distributed between two weakly correlated signals on two separate inputs, the first weakly correlated signal received on a first input and the second weakly correlated signal received on a second input;
  means for dividing the two weakly correlated signals into first and second divided signals, the first divided signal comprises one-half power of the first weakly correlated signal and one-half power of the second weakly correlated signal, and the second divided signal comprises one-half power of the first weakly correlated signal and one-half power of the second weakly correlated signal, the means for dividing further comprising a first output for providing the first divided signal and a second output for providing the second divided signal;
  means for amplifying the first divided signal coupled to the first output;
  means for amplifying the second divided signal coupled to the second output;
  means for recombining the amplified, divided signals into a first amplified input signal and a second amplified input signal; and
  means for radiating the recombined signals separately;
wherein the input power is distributed to the first weakly correlated signal is a·Pin and the input power distributed to the second weakly correlated signal is (1−a)·Pin;
wherein in unicast mode a is greater than 0 and less than 1;
wherein in multicast mode a is equal to 1; and
wherein Pin is the total input power.

15. The transmitter of claim 14, further comprising means for constant loading in unicast and multicast operation.

16. The transmitter of claim 14, further comprising means for equally distributing the two weakly correlated signals.

17. A transmit system comprising:
two receive inputs for receiving input power distributed between two weakly correlated signals, wherein a first signal of the weakly correlated signals is received on a first input of the two receive inputs and a second signal of the weakly correlated signals is received on a second input of the two receive inputs;
a balanced amplifier system for dividing, amplifying, and recombining the two weakly correlated signals, the balanced amplifier comprises a splitter having a first input for receiving the first signal and a second input for receiving the second signal, and first and second outputs, wherein the splitter is configured to provide one half the power of the first signal to the first output and one half the first signal to the second output, the balanced amplifier system further comprises a first amplifier having an input and an output, wherein the input is coupled to the first output of the splitter and a second amplifier having an input and an output, wherein the input of the second amplifier is coupled to the second output of the splitter, and the balanced amplifier system further comprises a combining circuit having first and second inputs coupled to the outputs of the first and second amplifiers respectively, and first and second outputs, wherein the combining circuit is configured to recombine the first signal from the outputs of the first and second amplifiers and to recombine the second signal from the outputs of the first and second amplifiers, wherein a recombined, amplified, first signal is provided at the first output of recombining circuit and a recombined, amplified second signal is provided at the second output of the recombining circuit; and
a two antenna array having a first antenna element coupled to the first output of the combining circuit and a second antenna element coupled to the second output of the combining circuit for radiating the amplified signals;
wherein the transmit system capable of switched operation between unicast and multicast transmissions;
wherein the input power is distributed to the first signal is $a \cdot P_{in}$ and the input power distributed to the second signal is $(1-a) \cdot P_{in}$;
wherein in unicast mode a is greater than 0 and less than 1;
wherein in multicast mode a is equal to 1; and
wherein $P_{in}$ is the total input power.

18. The transmit system of claim 17, wherein the splitter comprises:
a quadrature 3-dB splitter/combiner network; and
the combining circuit comprises a quadrature 3-dB splitter/combiner network.

19. The transmit system of claim 18, wherein the first and second amplifiers are half power amplifiers that produce a full power amplified signal upon recombination of the amplified split weakly correlated signals.

20. The transmit system of claim 18, wherein the two power amplifier components are constantly loaded in unicast and multicast operation.

21. The transmit system of claim 18, wherein the two weakly correlated signals are evenly distributed between the two power amplifier components in unicast and multicast operation.

* * * * *